March 11, 1924.  
G. W. TICE  
1,486,501  
ROTARY INTERNAL COMBUSTION ENGINE  
Filed Jan. 9, 1920  
8 Sheets-Sheet 1

March 11, 1924.

G. W. TICE 1,486,501

ROTARY INTERNAL COMBUSTION ENGINE

Filed Jan. 9, 1920  8 Sheets-Sheet 2

Inventor
George W. Tice.

By Charles E. Shaw
Attorney

March 11, 1924. 1,486,501

G. W. TICE

ROTARY INTERNAL COMBUSTION ENGINE

Filed Jan. 9, 1920     8 Sheets-Sheet 3

Inventor
GEORGE W. TICE

By Charles E. Wiser
Attorney

March 11, 1924. 1,486,501
G. W. TICE
ROTARY INTERNAL COMBUSTION ENGINE
Filed Jan. 9, 1920 8 Sheets-Sheet 6

NEUTRAL CIRCLE

Inventor
GEORGE W. TICE

By Charles E. Wimer
Attorney

March 11, 1924.

G. W. TICE 1,486,501

ROTARY INTERNAL COMBUSTION ENGINE

Filed Jan. 9, 1920  8 Sheets-Sheet 8

Patented Mar. 11, 1924.

1,486,501

UNITED STATES PATENT OFFICE.

GEORGE W. TICE, OF FLINT, MICHIGAN, ASSIGNOR TO TICE AND COMPANY, OF INDIANAPOLIS, INDIANA, A COPARTNERSHIP COMPOSED OF IRMA A. SCHROEDER, WILNA L. DOEPKER, ANGIE F. TICE, AND GEORGE W. TICE.

ROTARY INTERNAL-COMBUSTION ENGINE.

Application filed January 9, 1920. Serial No. 350,307.

*To all whom it may concern:*

Be it known that I, GEORGE W. TICE, a citizen of the United States, residing at Flint, county of Genesee, State of Michigan, have invented a certain new and useful Improvement in Rotary Internal-Combustion Engines, and declare the following to be a full, clear, and exact description of the same, such as will enable others skilled in the art to which it pertains to make and use the same, reference being had to the accompanying drawings, which form a part of this specification.

This invention relates to rotary internal combustion engines, the object being to provide a construction consisting of a rotor and a stator and means including pockets with which the rotor is provided in which a compressed fuel charge is introduced, the explosion of which causes rotation of the rotor. More particularly, the invention seeks to provide in mechanism of the character stated a rotor pocket for receiving a fuel charge the cubical content of which increases under movement of the rotor. The invention further has for its object a simple and efficient mechanism for providing a fuel charge under pressure and an automatic control of the fuel charge determining the speed at which the engine may operate. A further object of the invention is to provide in combination with a motor of the character stated, of manual control devices for starting and stopping the operation of the engine and an automatic means for scavenging the rotor pockets with fresh air subsequent to each explosion therein. A further feature of the invention resides in the means and method of supplying the fuel charge and, further, in the character of fuel charge itself, the mechanism employed providing a moisture laden charge. Another feature of the invention is involved in the introduction of this moisture laden fuel charge onto a heated member or wall of the fuel pocket in the rotor. Further features of the invention are involved in the specific means employed for automatically controlling the fuel charge and producing a scavenging air charge subsequent to the explosion and in the means for providing the scavenging charge. These several objects and other minor objects of the invention are hereinafter more fully described and claimed and the preferred form of construction embodying my invention is shown in the accompanying drawings in which—

Figures 4, 5:
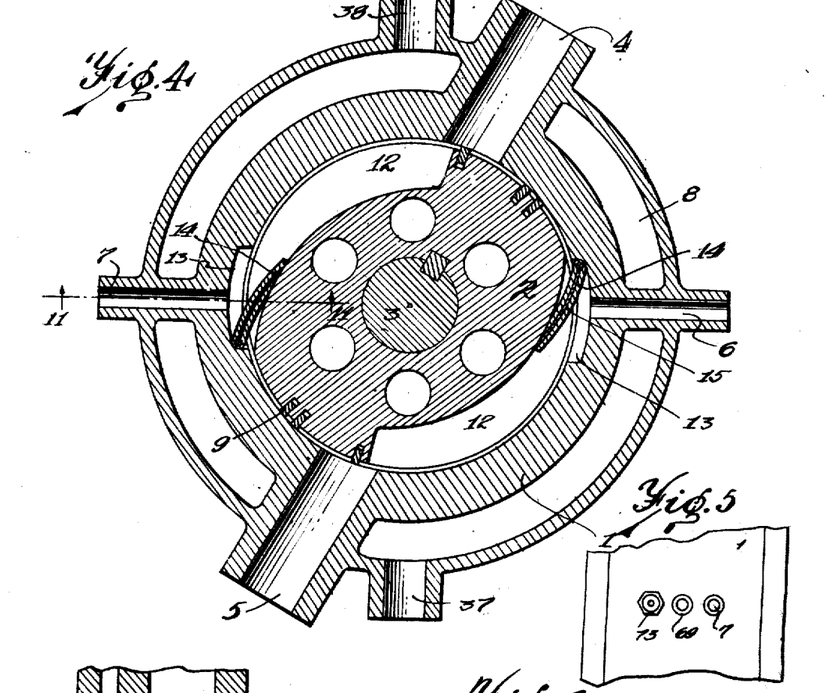
Fig. 4 is a vertical cross section through the motor showing the rotor and stator taken on line 4—4 of Fig. 11.
Fig. 5 is an elevation showing a portion of the motor and the inlet conduits for the fuel and air charges.
Figure 21:
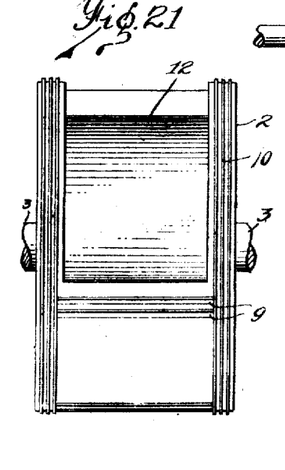
Fig. 21 is a detail of the rotor.

This invention consists of several elements in cooperative relationship—namely, a motor, air and fuel charge forming device, the control apparatus for the air and fuel charges, and the manual means for starting and stopping the motor. In order that the apparatus may be understood, the above enumerated units will be described successively. The construction of the motor will be readily understood from the sectional view Fig. 4 which shows the stator 1 and rotor 2 which is keyed to the shaft 3. The rotor is mounted centrally within the stator to rotate therein, the stator being provided with exhaust channels or conduits 4 and 5 on diametrically opposite sides thereof and intake conduits 6 and 7 at diametrically opposite sides as shown. The rotor is provided with two pockets therein as will be understood from Figs. 4 and 21, these pockets being formed in the face of the rotor between the side walls and the rotor is provided with packing members 9 extending transversely of the rotor at each end of each pocket and the rotor is further provided with the peripheral rings 10 extending circumferentially thereabout on each side of the pockets as shown more clearly in Fig. 21. The rotor pockets 12 have a curved wall at the bottom eccentric to the axis of the rotor being of full depth at the forward end and decreasing in depth in a direction the reverse of that of the direction of rotation of the rotor. Each inlet conduit 6 and 7 terminates in what I have called a pocket 13 and in each pocket is pivotally mounted a plate 14 being pivotally supported at the rear end in each pocket as shown in Fig. 4 and provided with a packing member 15 on each side of the plate as will be understood more clearly from Fig. 11 so that the plate tightly engages the side walls of each pocket when it is positioned therein as shown in Fig. 4. These plates or valve members are adapted to lie wholly within the pockets 13 therefor and are moved thereinto by the rotor due to the periphery of the rotor at the point of full diameter folding the same backward into the pocket. As will be hereinafter described the fuel charge is delivered under pressure into these pockets and therefore, when the valve members or plates are occupying the pocket provided therefor, the conduits 6 and 7 are practically closed to the rotor. On the turning of the rotor, however, and the passing of the forward end of the pocket beyond the free edge of the valve member 14 the fuel conduit is opened to its supply and fuel under pressure in the conduit opens the valve 14 which moves into the pocket and the free edge of which contacts the bottom of the pocket. By reason of the valve being packed relative to the side walls of the pocket when the valve moves inward thereinto in contact with the bottom of the pocket, the pocket forward of the valve member becomes filled with the fuel charge. The pocket thus filled is not the entire pocket of the rotor and upon an explosion of fuel charge between the forward wall of the pocket and the valve member the rotor is moved forward principally due to the fact that such movement increases the cubical content of the pocket between the valve and forward end of the pocket. Thus, the expansion of the exploded fuel charge causes rotation of the rotor. The mechanism for igniting the charge and of admission of the scavenging air charge is hereinafter described. It will be noted, however, if an additional conduit be provided adjacent the fuel conduit shown in Fig. 4 and opening through the same valve pocket in each case, that as the fuel is ignited and the rotor turned substantially to position shown in Fig. 4 relative to the stator, a scavenging air charge may be introduced into the pocket under pressure which will blow through the pocket to the exhaust port 4 and 5, the fuel charge controlling mechanism admitting the air charge as the forward end of the pocket opens to the exhaust port in each instance. Thus, as the fuel charge is first introduced when the forward edge of the pocket is a short distance forward of the valve and expansion of the ignited gas moves the rotor from such position to the position shown in Fig. 4, the burned gases are thereupon exhausted, not alone by the tendency of the burned gases to still expand but also by reason of the compressed air charge introduced at the rear end of the pocket. After the pocket 12 for instance has reached this position of scavenging it moves forward and opens the intake port 8 and the compressed fuel charge is again introduced, ignited and discharged as before. Each pocket is thus filled with a charge and ignited twice during each revolution in the construction here shown, but it is to be understood that the rotor and stator may be so constructed that the rotor pocket or pockets may be filled and discharged a more or less number of times for each revolution if desired simply by the provision of additional intake and exhaust ports and valve members.

Figure 1:
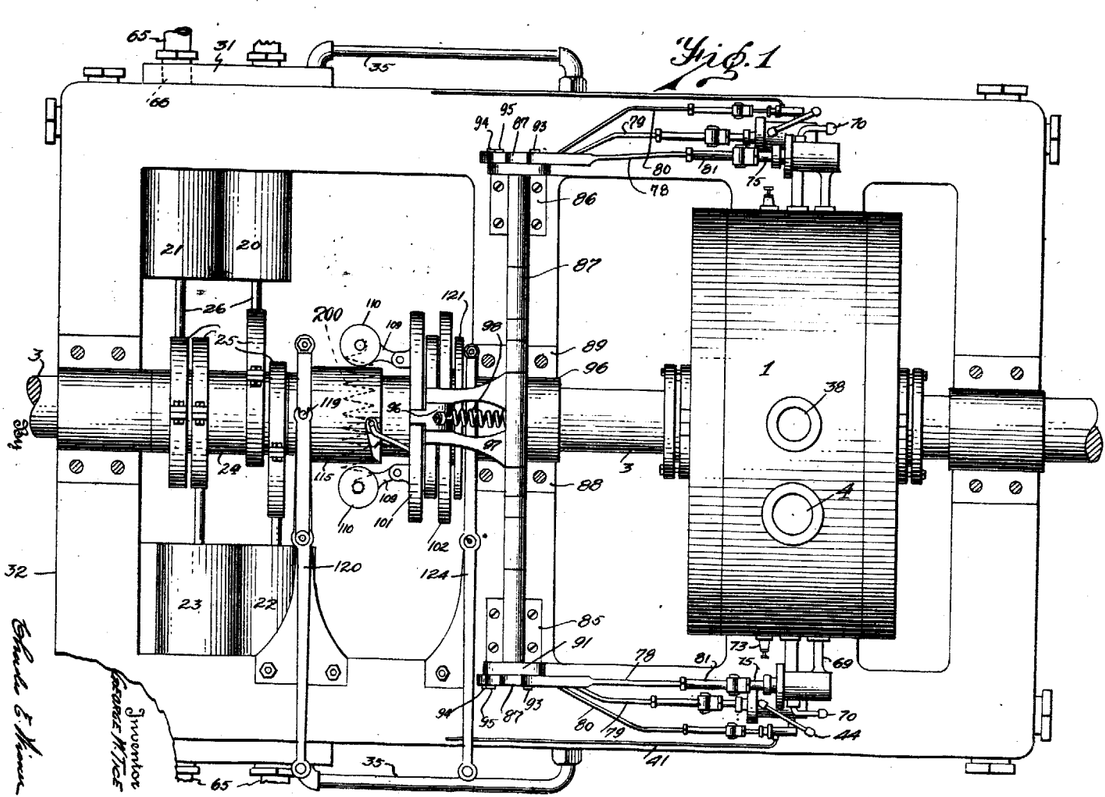
Fig. 1 is a plan view of a rotary engine of the internal combustion type embodying the several features of my invention.
Figure 2:
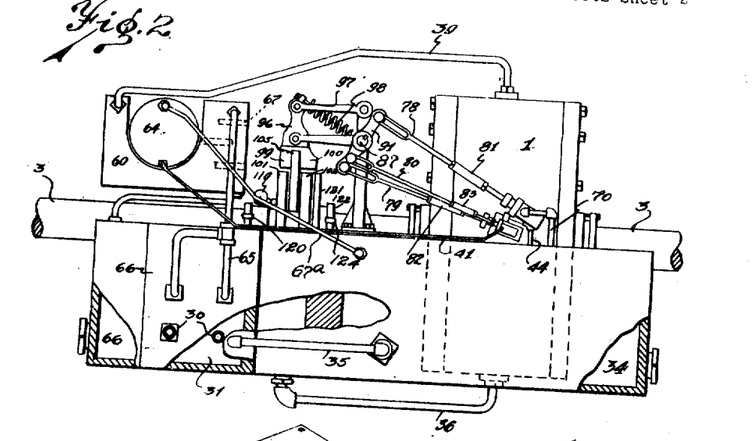
Fig. 2 is a side elevation thereof on a smaller scale.
Figure 6:
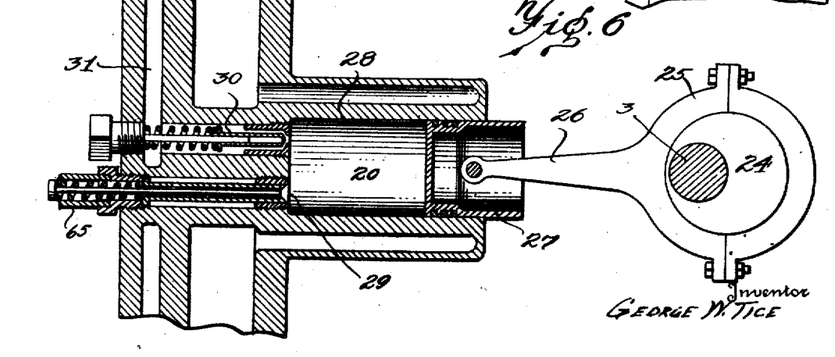
Fig. 6 is a detail partly in section showing the air pump for providing the fuel with a portion of air and for providing the scavenging charge.
Figure 10:
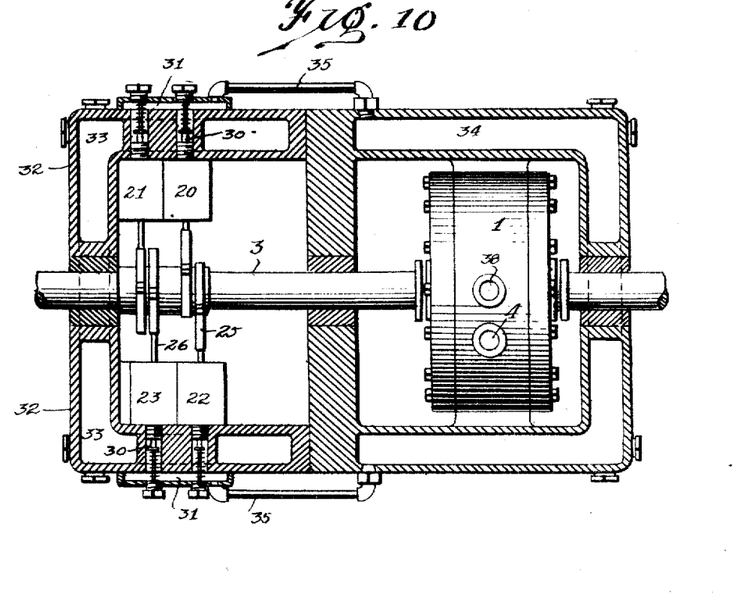
Fig. 10 is a horizontal section of the engine and mounting thereof showing the water and air chambers.

The charge forming device is shown more particularly in Figs. 1, 6 and 10. This device consists of two pairs of air compressors 20, 21, 22 and 23, the pairs 20 and 21 being on one side of the shaft 3 and the other pair being on the opposite side. These compressors are each of the character shown in Fig. 6 being operated by an eccentric 24 on the shaft 3 about which is an eccentric ring 25 provided with an extension forming a piston rod 26 connected with a piston 27 reciprocating in the cylinder 28 of each compressor. Each compressor is provided with an intake valve 29 opened on reduction of pressure within the cylinder and an exhaust valve 30 opening on the compression stroke and increase of pressure in the cylinder. The exhaust valve opens to a conduit 31 formed in the head of the cylinder which, as is shown in Fig. 10, is on the outer side of the main casing 32. This framework or casing 32 is provided with a hollow chamber 33 adjacent the pump end for water and adjacent the motor end the casing is also hollow as indicated providing an air chamber 34. A tube or conduit 35 connects the chamber or conduit 31 of each air compressor with the air chamber 34. The eccentrics for the two pairs of pumps are oppositely set as shown. That is—the eccentric for the cylinder 20 of one pair is set opposite to that of the cylinder 21 of the same pair so that as one compressor on one side is on the intake stroke the companion compressor on that same side is on the compression stroke and this arrangement equalizes the torque on the shaft 3. These compressors and air chambers form what I have termed the air unit heretofore mentioned and the compressed air provided by these compressors is utilized in the formation of the fuel charge and for the scavenging air charge herein described. The motor is supplied with water from the chamber 33 by means of a pipe or conduit 36 leading into the outer case 8 of the motor through a port 37 shown in Fig. 4 and is discharged through a port 38 at the top thereof and into a conduit 39, as shown in Fig. 2, leading to a cooling and charge forming device hereinafter described.

Figure 3:
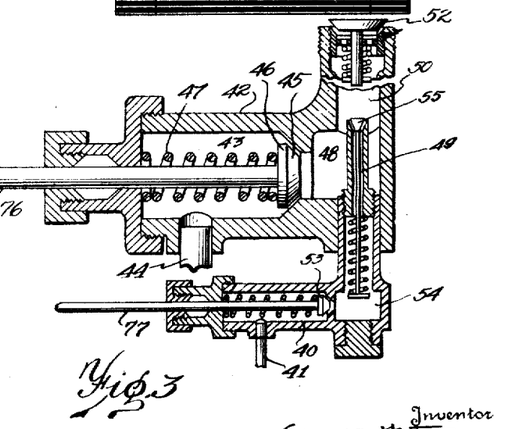
Fig. 3 is a plan view in section of the air and oil control valves.
Figure 11:
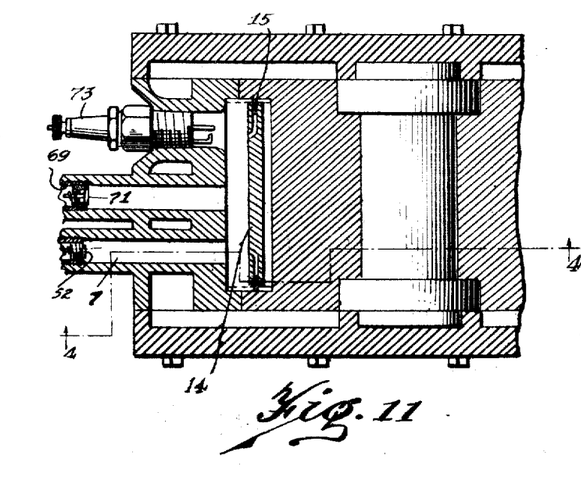
Fig. 11 is a section taken on line 11—11 of Fig. 4.
Figure 12:
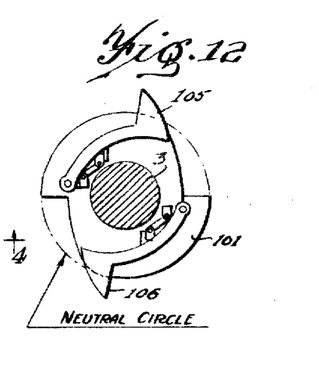
Fig. 12 is a detail of the cam which controls the flow of the fuel and air charges.
Figure 17:
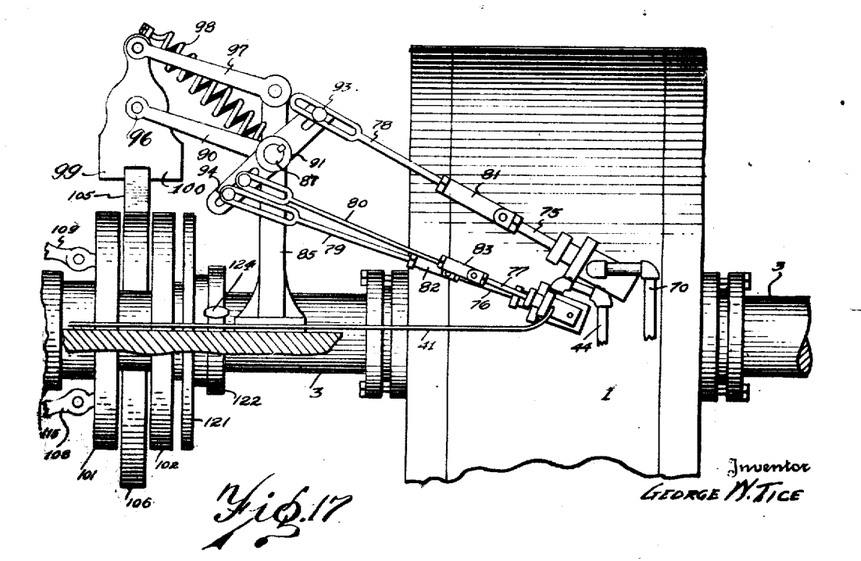
Figures 18, 19, 20:
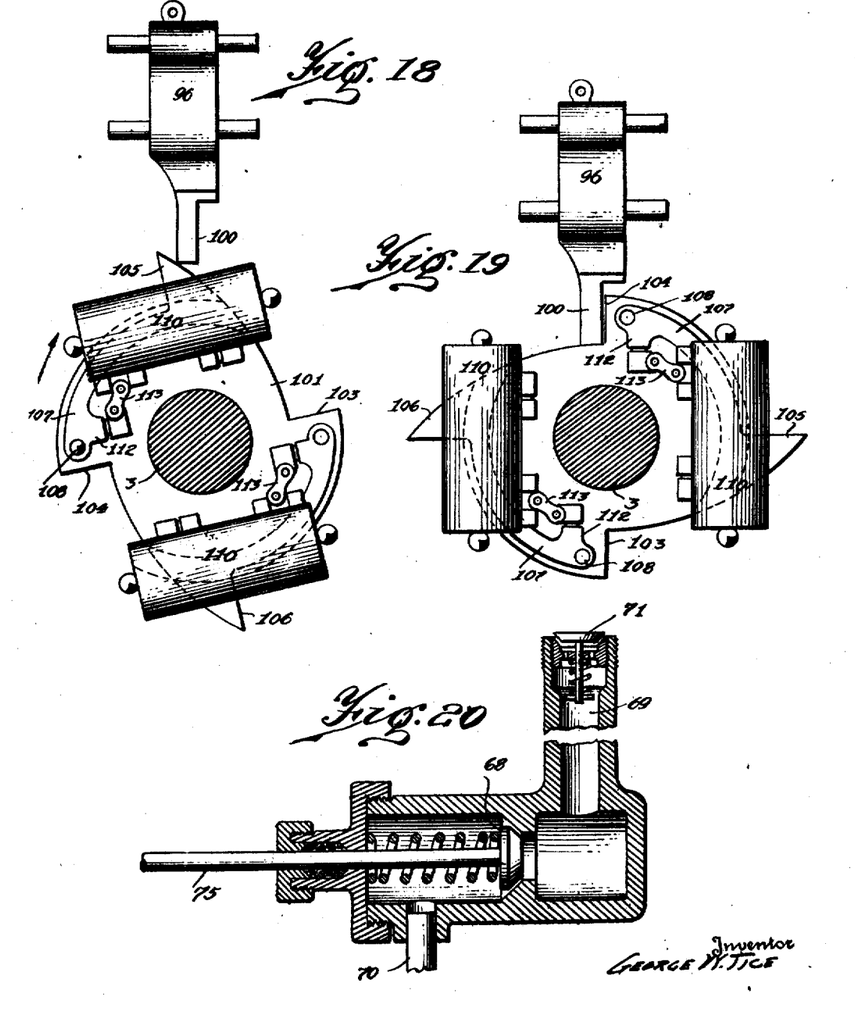
Figs. 18 and 19 are views similar to Fig. 9 illustrating the operation of the air and fuel charge controlling mechanism.
Fig. 20 is a sectional view of the air charge control valve for the scavenging operation.

The control of flow of fuel and air charges to the motor is secured by a valve mechanism and control apparatus therefor shown in Figs. 1, 3, 13, 15, 17, 18, 19, and 20. The control valve for the oil and air charge is shown in Fig. 3 and the control valve for the scavenging air is shown in Fig. 20. These valves are secured to the motor casing, there being a valve of each type for each pocket of the rotor and positioned on the stator as indicated in Figs. 4 and 11. The fuel charge forming device consists of a valve mechanism 40 into which leads the fuel line 41 and further consists of an air valve mechanism 42. The air valve mechanism comprises a chamber 43 open to the air line 44 on one side. A valve seat 45 is formed at the bottom of the chamber 43 and the valve 46 is held normally closed by a spring 47. Air is discharged from this chamber 43 into a chamber 48 into which a conduit 49 from the fuel valve also leads. There is an outlet conduit 50 for this chamber 48 which is screwed into the intake conduit 7 or 8 provided therefor on the stator as shown in Figs. 4 and 11. A check valve 52 is provided in this conduit 50 which is closed by an excess of pressure on the motor side thereof. The fuel valve mechanism 40 is provided with a spring closed valve 53 which closes an opening into a chamber 54 leading into the conduit 49 and in this conduit is a spring closed check valve 55 that is opened by pressure on the fuel in the chamber 54 and fuel under pressure is fed into this chamber 54 and conduit 49 and air under pressure is discharged into the chamber 48, the areas of the valve openings and the pressures at which the air and oil are delivered producing the necessary proportions for an explosive mixture for the fuel pockets of the rotor.

Figures 14, 15:
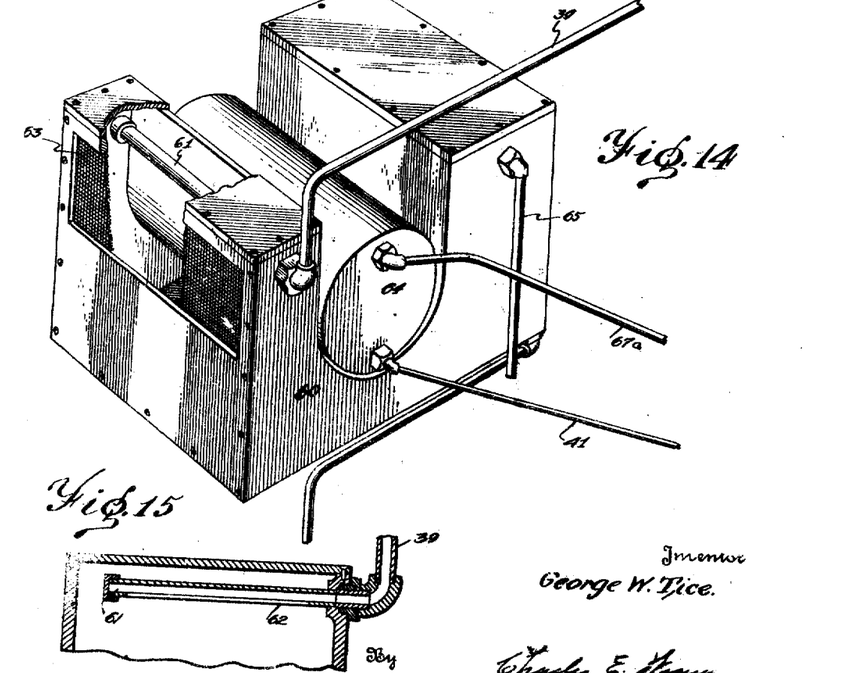
Fig. 14 is a detail in perspective of the water cooling and air moistening device.
Fig. 15 is a detail in section of the means employed in the said air cooling device for discharging the heated water from the motor.

The air charge provided for the fuel and air valves is preferably a moist air and to provide a moisture laden air I provide a cooling tank 60, shown in Fig. 14, adapted to hold a supply of water. This tank is of the character of a radiator in that the heat is extracted from the water when passing into and through this tank. The conduit 39 from the motor leads into the top of this tank terminating therein in a tube 61 extending laterally across the tank at the upper end and this tube is provided with a slot 62 in the lower edge thereof through which the water is discharged into the tank practically in a thin sheet or film of water. Adjacent this upper end I provide an opening preferably covered with a wire cloth 63 through which air may be drawn directly through this sheet of water discharged through the slot 62 of the discharge pipe. In the construction here shown the tank 60 is substantially U shaped in form and within the U is located the oil tank 64. The discharge pipe 61 is in the upper end of one leg of this U tank. Air for the compressors is drawn from the top of the other leg of the U tank by means of the pipe 65 connected with a chamber 66 in communication with the inlet conduits of both pairs of compressors. Thus, the compressors draw the air from the top of one leg of this U and the air is introduced in the top of the other which must therefore pass through this sheet of water and across the water lying in the bottom of the tank and across baffle plates 67 which, as indicated by dotted lines in Fig. 2, are provided in the tank so that air ascending this leg of the U tank passes across these baffles and excess of moisture is eliminated prior to passing to the compressors. The air utilized with the motor is thus moisture laden and as the fuel on discharge into the motor is discharged directly against the valve plate 15, which is heated in operation of the engine, the production of a super-heated steam is caused and also a very highly vaporized fuel charge. As heretofore stated, the compressed air is stored in the chamber 34 in the framework on which the motor is mounted and the fuel valve is supplied with air by a pipe 44 directly connected with this air chamber. This fuel valve is supplied with oil through the pipe 41 leading to the bottom of the fuel tank 64 and this fuel is placed under pressure by means of a pipe 67ª connecting with the air chamber of the framework and to the top of the fuel tank and thus the fuel and air are discharged through the fuel valve at the same pressure.

The air scavenging valve is shown in Fig. 20 which is similar in all respects to the air valve of the fuel charge forming device shown in Fig. 3, being provided with a valve member 68 controlling the flow of air through the conduit 69 leading to the rotor pockets. A check valve 71 is provided in this conduit 69 and the valve is supplied with air by means of a pipe 70 directly connected with the air chamber of the motor frame. Thus, on opening the fuel charge valves 45 and 53 shown in Fig. 3, the fuel charge is delivered into the rotor pockets and thereafter, as the rotor pocket approximately reaches the exhaust port, the air valve 68 is opened and air under pressure is discharged into the pocket forcing the burned gases out through the exhaust port. There is not a very great quantity of air discharged by the scavenging device, being only sufficient to move the burned gases at the time of the oil discharge, the pocket remaining practically filled with air at atmospheric pressure due to the fact that, subsequent to the discharge of the air and the closing of the valve 68, the open rotor pocket passes entirely across the open discharge port so that any excess of pressure in the rotor pocket is relieved.

As will be understood from Fig. 1 there are two sets of fuel and air charge valve mechanisms positioned on opposite sides of the rotor and supported thereon as heretofore described. These ports for air and fuel opening into the rotor are positioned in alignment parallel with the axis of rotation of the rotor as will be understood from Figs. 1 and 11 and the spark plug 73 is provided opening into the valve pocket of the stator as shown in Fig. 11.

Figure 13:
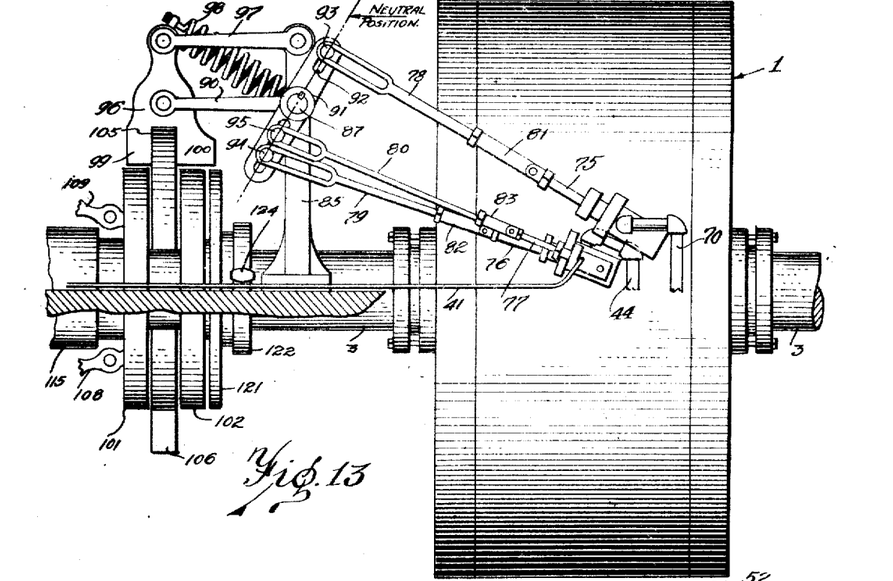
Fig. 13 is an enlarged view showing the motor and the mechanism for discharge of fuel and air thereto.

The air and fuel valve mechanisms are actuated by a timing mechanism shown more particularly in Figs. 7, 8, 9, 12, 13, 15, 17, 18, and 19. As shown in Figs. 3 and 20 the air valve 68 is provided with an operating stem 75 and the air valve 45 of the charge forming device is provided with an operating stem 76 and the fuel valve 53 is provided with an operating stem 77. These valve stems are pivotally connected respectively to the rods 78, 79, and 80 as shown in Fig. 13 which are slotted at the end as shown. Furthermore, these rods are threaded into sockets 81, 82 and 83 respectively permitting adjustment of their length to vary the opening or time of opening of the valves to the stems of which these last named members are pivoted.

Figure 16:
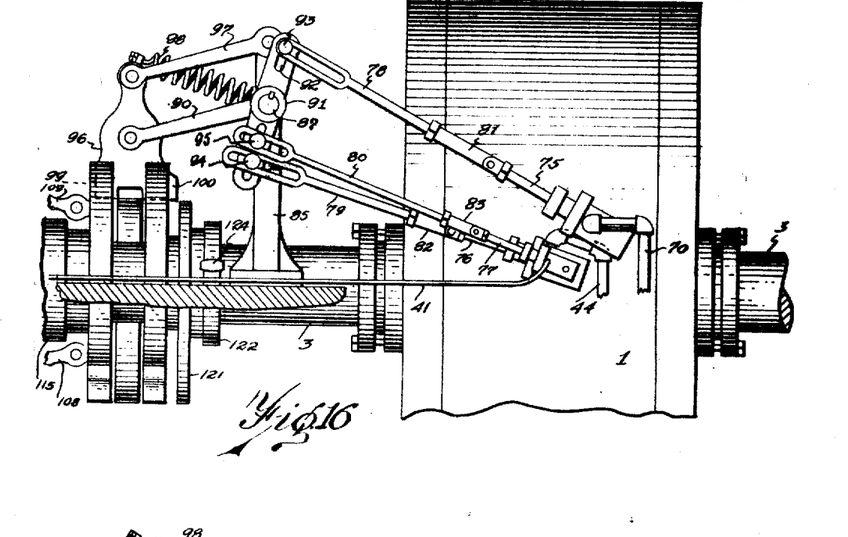
Figs. 16 and 17 are views similar to Fig. 13 showing different positions of the fuel charge controlling devices.

Mounted on the framework is a bracket 85 on one side and a similar bracket 85 on the opposite side as shown in Fig. 1. A shaft 87 extends transversely of the framework supported in these brackets and in the pair of central brackets 88 and 89 between which is an operating arm 90 hereafter described. On opposite ends of the shaft 87 is keyed a slotted rock lever 91 extending each way from the center of the shaft and the upper end is slotted as indicated at 92 in which is a pin 93 adjustable in the slot and this pin projects through the slot in the arm 78. The opposite end of the rock lever is slotted and provided with the pins 94 and 95 adjustable in position in the slot, the pin 94 extending through the slot of the arm 79 and the pin 95 extending through the slot of the arm 80. The valves are operated by an oscillation of this rock lever 91. In the position of this arm shown in Fig. 13 the valves are closed, the arm or lever 91 occupying what I have termed its neutral position. If now the lever 91 be turned to the left as shown in Fig. 16, the scavenging valve 68 will be opened while the valves of the fuel charge forming device will remain closed as the pins 94 and 95 may ride down the slots therein. Upon the lever 91 being rocked in an opposite direction as is shown in Fig. 17 the fuel charge forming valves 45 and 53 will be opened and the air charge valve 68 will be closed due to the action of its spring which is permitted to act due to the fact that the pin 93 travels down the slot of the arm connected with this air valve 68. Thus, by the rocking of this lever 91 in timed relation with the movement of the rotor pockets, a fuel charge is introduced when the parts assume the position shown in Fig. 17 and immediately thereafter these fuel charge valves are closed and the air valve opened on the lever assuming the position shown in Fig. 16 which scavenges the pockets. This shaft 87 (on which the rock levers 91 are positioned at each end as heretofore stated) is rocked by means of the lever 90 which is attached to the shaft 87 at one end and pivotally connected with an actuating member 96 at the other.

The actuating device 96 for rocking the shaft 87 is shown clearly in Figs. 9, 13, 16, 17, 18 and 19. This member 96 is pivotally connected to an arm 90 secured to the shaft 87 between the bearings 88 and 89. This arm is of two parts as shown in Fig. 1 extending on each side of the member 96. The top of the member 96 is also pivotally connected to a link 97 which in turn is pivotally connected to a rod extending between the top of the bearing brackets 88 and 89 as will be understood from Fig. 1. A coiled spring 98 is attached to the upper end of the member 96 and to the shaft 87. This spring is under tension and due to its angular position tends to draw the member 96 downward into contact with the cam members hereafter described. The member 96 is bifurcated at the lower end having two arms 99 and 100. These arms ride on two cam plates respectively 101 and 102 which are mounted on the shaft 3 but are loose thereon to enable the same to be turned for a purpose hereinafter described. The cam members, however, as is hereinafter shown, rotate with the shaft and turn together. These cam members are similarly shaped in the case shown having two notches 103 and 104 corresponding in number to the number of rotor pockets cut below the circumference of the cam members. These notches are on diametrically opposite sides as shown particularly in Fig. 9 and the direction of rotation of the said cams is shown by an arrow in the said Fig. 9. These two cam members or plates 1 and 2 are spaced apart longitudinally of the shaft as shown in Fig. 8 and between the cam members is what I have termed the fuel or gas cams 105 and 106 positioned 180 degrees apart and 90 degrees from the notches in the cam members 101 and 102. These cam members 105 and 106 are formed on a semi-circular arm 107 in each case, each being provided with a pin 108 extending on each side of the arm into apertures provided in each member 101 and 102 as will be understood from Fig. 8. These pins connect the two cams together with the notches 103 and 104 of each cam in alignment longitudinally of the shaft. These cams 101 and 102 are engaged by the two arms 99 and 100 of the member 96 and due to the tendency of the spring to draw the member 96 downward, the member 96 drops into the notches or cut out portions 103 and 104 causing the bar 91 to assume the position shown in Fig. 16 opening the air scavenging valve. The cam members 105 ride in the member 96 between the portions 99 and 100 and twice during each revolution these members 105 and 106 raise the member 96 to position shown in Fig. 17 permitting the air scavenging valve to close and opening the fuel charge valve mechanism. After the member 96 drops into the notches 103 or 104 of the cam members, continued rotation of the cams 101 and 102 causes the member to gradually rise from the bottom of the notches to the periphery of the cam members and to continue to rise due to its being engaged by the cam 105 or 106 pivotally connected between the cam members 101 and 102 which I will hereafter term the air cams. Upon the cam 105 or 106 passing beneath the member 96, said member drops to neutral position with the parts 99 and 100 engaging the periphery of the air cams, and when the notches of the air cams are brought beneath the members 99 and 100, the member 96 drops below its neutral position to open the air scavenging valve. These gas cams vary the amount of explosive mixture delivered to the rotor pockets and are variable in position radially from the shaft center under an increase in speed of operation of the motor due to the actuation by centrifugal force of a pair of weighted levers 109 and 110 pivotally supported on lugs provided on the cam member 101. These levers are connected by a spring 200 and have the forward ends pivotally connected by means of a link 111 in each case to a short end 112 of each lever 107 on which the cam members 105 and 106 are connected. Thus, if under centrifugal action, the weights of these levers tend to move outward from the shaft 3, as will be understood from Fig. 9, the cams 105 and 106 will tend to draw inward toward the shaft 3 decreasing the extent to which the cam members extend beyond the neutral circle and decreasing the fuel charge. Upon a tendency of these weighted levers to move toward the center, the cam members are moved outward from the shaft increasing the amount of fuel delivered to the engine and tending to increase the speed thereof. This construction of the gas cams and weighted levers provides an automatic governor for the engine.

The several cam members, 101, 102, 105 and 106 are all united together and revolve as a unit with the shaft and any alteration in position of the said members rotatively of the shaft varies the positions of the cams as a unit relative to the time of the rotor pocket in passing the fuel and air ports. That is—by varying the position of the cam members rotatively of the shaft 3 the fuel charge may be introduced early or late to the fuel pockets of the rotor and similarly the scavenging air charge will be introduced early or late. Thus, the engine may be throttled by the turning of these cam members on the shafts 3 whereby the engine may be made to idle when not running under load using but a small fuel charge by reason of its being delivered late to the rotor pocket, or the engine may be made to run under a full load by advancing the time of introduction of the fuel charge.

Figure 7:
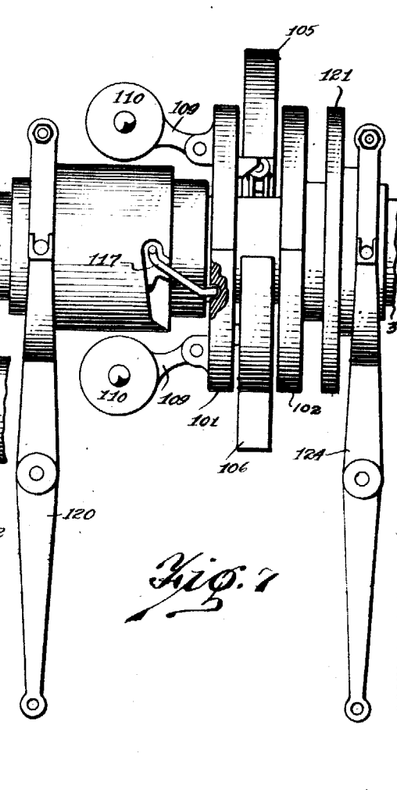
Fig. 7 is a plan view of the mechanism for automatically controlling the fuel and air charges.
Figures 8, 9:
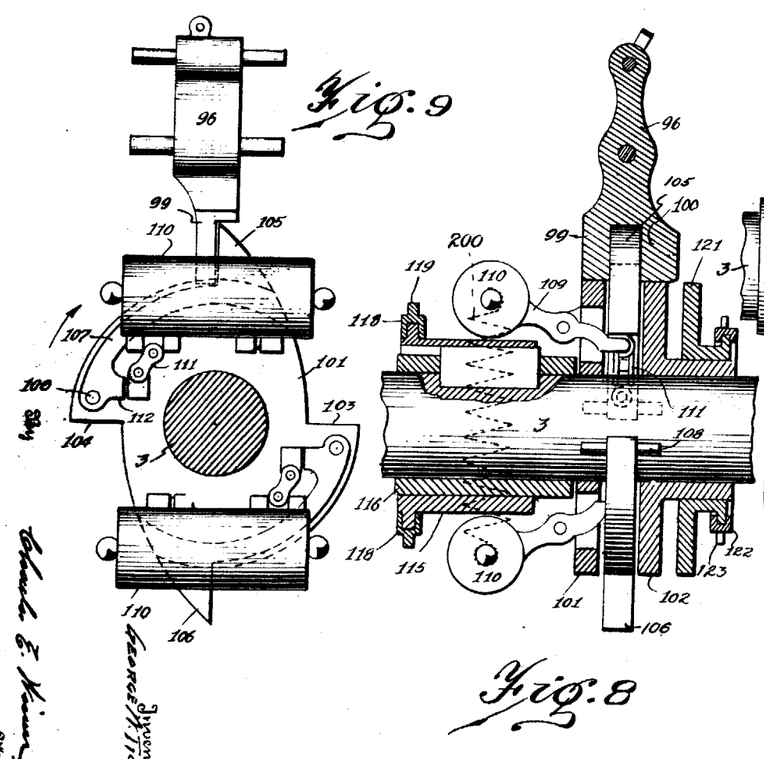
Fig. 8 is a section taken on line 8—8 of Fig. 7.
Fig. 9 is a section taken on line 9—9 of Fig. 8.

This rotative movement of the cam group is accomplished by means of a sleeve 115 keyed to the shaft 3 and movable longitudinally on a bushing 116 which is also keyed to the shaft as will be understood from Fig. 8. On this sleeve 116, as shown in Fig. 7, is pivotally mounted a pawl 117 the opposite end of which is ball shaped and riding in a notch provided in the cam member 101. This sleeve 115 is provided with a flange at one end on which is mounted a ring 118 provided with pins 119 extending outwardly therefrom engaging the yoke of an operating lever 120. This lever is pivoted as indicated in Fig. 7 and by moving the same to the right or to the left, as occasion may require, the cam members are turned on the shaft to either retard or advance the speed of operation of the engine due to decreasing or increasing the amount of fuel charge delivered to the fuel pockets as above described.

If when the engine is running, it is desired to stop the operation thereof the ignition circuit may be disconnected in the usual manner preventing ignition of the charges in the rotor pockets. In such case, however, the engine may stop in such position that the scavenged air valve or the fuel charge valve may be open. To prevent such condition arising I have provided a circular disc 121 supported on the hub of the cam member 102. The hub of this disc is provided with a ring 122 engaging a flange thereon and this ring is provided with pins 123 engaging the yoke of a lever 124. This lever, as will be understood from Fig. 7, may be moved to the right or to the left, and it is further to be noted that the arm 100 of the member 96 is greater in width than the width of the face of the cam 102 and extends therebeyond as will be understood from Fig. 8. The disc 121 is of a diameter equal to that of the neutral circle of the cams 101 and 102 but is substantially circular in form. Thus, it may be seen that by moving this member 121 to the left of the position shown in Fig. 8 it is moved beneath the arm 100 of the valve actuating member 96 and this prevents the member 96 from dropping into the notches 103 and 104 of the cam members 101 and 102 preventing the scavenging air being discharged through the air valve and pockets of the rotor and, owing to cessation in speed of rotation of the shaft, the weights of the levers 109 and 110 are drawn toward the center by action of the spring 200 shown by dotted lines in Fig. 8. While this action of the spring tends to throw the fuel cams outward from the center and raise the actuator 96 from its neutral position, possibility of the engine ceasing to rotate at a point at which the member 96, is so raised, is remote, but in the event that the engine should stop with the actuator 96 in raised position and opening the fuel charge valve, the shaft should be turned so as to permit the actuator to occupy its neutral position in order to prevent an escape of air or fuel into the rotor case when the engine is not in operation.

The operation of the engine is simple in the extreme. The engine is started by first withdrawing the disc 121 from engagement beneath the arm 100 of the actuator 96. Considering that there is storage of air under pressure in the air chamber, the rotation of the shaft 3 and rotor thereon brings the rotor pocket to position to receive a fuel charge, and it is to be noted that in thus turning the shaft, the centrifugal force is insufficient to draw the fuel cam levers inward and thus the fuel cams are in extended position causing a full fuel charge to be introduced into the rotor pockets. Ignition of the charge causes rotation of the rotor and, when the rotor pocket is open to the exhaust port, scavenging air is introduced into the rotor pocket forcing the burned gases therefrom as heretofore described. As the engine begins to operate by its own power, the sleeve 115 may be moved toward the cam group which turns the said group on the shaft to advance the time of movement of the actuator 96 and consequently the time of introduction of the fuel charge and thus accelerates the operation of the engine. By movement of the operating lever 120 toward or from the cam group, speed of operation of the engine is increased or retarded.

Having thus fully described my invention, what I claim and desire to secure by Letters Patent of the United States is—

1. In an internal combustion engine, a stator and a rotor, the rotor having a series of pockets formed in the face thereof open to the inner face of the stator, a series of valve plates equal in number to the number of pockets and being pivotally supported on the stator, said stator having a recess for each valve plate, a fuel intake line and an air line for each valve recess opening directly thereinto behind the valve plate, a plurality of exhaust ports equal in number to the number of rotor pockets to which the said pockets open subsequent to ignition of the fuel charge, a valve for the fuel intake and a valve for the air supply line of each group, an operating mechanism therefor comprising a cam member rotatable in fixed relation with the rotor, a member riding on said cam, a rock lever actuatable by movement of the said cam riding member, the air supply valve being connected at one end of the rock lever, and the fuel control valve being connected with the other end of the rock member.

2. In an internal combustion engine, a stator and a rotor, the rotor having a pocket formed in the face thereof open to the face of the stator, a valve plate pivotally supported in the stator, the stator having a recess to permit the plate to recede or move thereinto, an intake port and an exhaust port in spaced relation in the stator, a compressed air supply conduit, the said air supply conduit and intake port both opening into the valve plate recess, a valve controlling the intake port and a valve controlling the compressed air supply conduit, a rock arm, the air supply conduit valve being connected with one end thereof and the intake control valve being connected with the other end thereof, a rock shaft for the said arm, a lever connected with the shaft, a cam member rotatable in unison with the rotor, an actuator riding the said cam and pivotally connected with the last named arm, movement of the actuator causing the shaft to be rocked and the intake valve and air supply valve to be actuated in alternate relation, and means for adjusting the connection of the respective valve members with the arm to vary the time of actuation of the valves.

3. In an internal combustion engine, a stator and a rotor, the rotor having a plurality of pockets formed in the face thereof open to the face of the stator, a valve plate for each pocket pivotally supported on the stator, the stator being recessed to permit each plate to recede thereinto, a fuel supply line and a compressed air supply line for each valve plate recess and opening directly thereinto, a valve in each of the said lines, a shaft for the rotor, a cam member on the said shaft of fixed form having a number of low points thereon corresponding to the number of rotor pockets, and a number of variable cam members corresponding to the number of rotor pockets, the high point of which is variable due to centrifugal action, an actuator riding the said cam members, a spring holding the actuator in contact therewith, a lever pivoted to the actuator, a rock shaft to which the lever is fixed, a series of arms on the shaft equal in number to the number of valve plate recesses, a rod connected with one end of the said arm and with a fuel valve, another rod connected with the opposite end of the said arm on the opposite side of the rock shaft, said rod being connected with the air supply valve, the fuel valve rod and air supply valve rod each being slotted to permit movement of the arm in one direction without actuating the rod, the fixed cam member permitting movement of the actuator from a neutral point to actuate the rock shaft and open the air line valve and the adjustable cam member forcing the actuator in the opposite direction from a neutral point to open the fuel intake valve.

In testimony whereof I sign this specification.

GEORGE W. TICE.